(12) United States Patent
Wystup et al.

(10) Patent No.: US 11,525,591 B2
(45) Date of Patent: Dec. 13, 2022

(54) POSITIONING SYSTEM AND METHOD FOR DETERMINING THE POSITION OF FANS

(71) Applicant: ebm-papst Mulfingen GmbH & Co. KG, Mulfingen (DE)

(72) Inventors: Ralph Wystup, Künzelsau (DE); Markus Humm, Weißbach (DE); Alexander Rau, Leingarten (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 363 days.

(21) Appl. No.: 16/723,682

(22) Filed: Dec. 20, 2019

(65) Prior Publication Data
US 2020/0300490 A1 Sep. 24, 2020

(30) Foreign Application Priority Data

Mar. 19, 2019 (DE) .......................... 102019106946.7

(51) Int. Cl.
*F24F 11/30* (2018.01)
*F24F 11/77* (2018.01)
*F24F 11/49* (2018.01)
*F24F 7/007* (2006.01)
*G01D 7/10* (2006.01)
*F04D 25/16* (2006.01)
*F24F 3/167* (2021.01)
*G01H 1/00* (2006.01)

(52) U.S. Cl.
CPC ............ *F24F 11/30* (2018.01); *F04D 25/166* (2013.01); *F24F 7/007* (2013.01); *F24F 11/49* (2018.01); *F24F 11/77* (2018.01); *G01D 7/10* (2013.01); *F24F 3/167* (2021.01); *G01H 1/003* (2013.01)

(58) Field of Classification Search
CPC .. F24F 11/30; F24F 11/77; F24F 7/007; F24F 11/49; F24F 3/167; F04D 25/166; G01D 7/10; G01H 1/003; Y02B 30/70
USPC .......................................................... 454/187
See application file for complete search history.

(56) References Cited

U.S. PATENT DOCUMENTS

| 8,818,705 | B2 | 8/2014 | Spata | |
| 10,137,984 | B1 | 11/2018 | Flick | |
| 2002/0121555 | A1* | 9/2002 | Cipolla | ............. G06F 15/17381 236/49.1 |
| 2015/0177750 | A1* | 6/2015 | Bailey | ................ G05D 23/1932 700/275 |

(Continued)

FOREIGN PATENT DOCUMENTS

| CN | 102597529 A | 7/2012 |
| CN | 104103168 A | 10/2014 |

(Continued)

OTHER PUBLICATIONS

Extended European Search Report dated Jul. 29, 2020.
German Search Report dated Nov. 5, 2019.

*Primary Examiner* — Steven B McAllister
*Assistant Examiner* — Charles R Brawner
(74) *Attorney, Agent, or Firm* — Dickinson Wright PLLC

(57) ABSTRACT

The disclosure relates to a method for determining the positions of a number of fans (Vn,m) for generating an air flow in a preferably enclosed space, which have a speed sensor for determining their position, wherein the fans (Vn,m) are arranged in rows (R1, R2, . . . , Rn) and columns (S1, S2, . . . , Sm), wherein at least the position (i, j) of one fan (Vi,j) is known.

19 Claims, 6 Drawing Sheets

(56) References Cited

U.S. PATENT DOCUMENTS

2016/0340006 A1 11/2016 Tang
2017/0307246 A1 10/2017 Ohara et al.
2018/0135878 A1 5/2018 Iura et al.

FOREIGN PATENT DOCUMENTS

| | | |
|---|---|---|
| CN | 107110552 A | 8/2017 |
| CN | 108307648 A | 7/2018 |
| CN | 108507132 | 9/2018 |
| CN | 108507132 A | 9/2018 |
| CN | 109073252 A | 12/2018 |
| JP | H09282007 A | 10/1997 |
| JP | 3439908 | 8/2003 |
| JP | WO2017195286 | 8/2018 |

* cited by examiner

POSITIONING SYSTEM AND METHOD FOR DETERMINING THE POSITION OF FANS

RELATED APPLICATIONS

This application claims priority to German Patent Application No. 10 2019 106 946.7, filed Mar. 19, 2019, the entire contents of which are incorporated herein by reference in their entirety.

FIELD

The disclosure relates to a positioning system and a method for determining the position of fans.

BACKGROUND

It is necessary to determine the position of fans installed within a network in a clean room, for example to represent them in a layout plan of the room.

Modules called filter fan units (FFUs) are used in buildings. Such a module, typically consisting of a fan and a filter, takes in air from above and blows it through the filter into the room. Its purpose is permanent filtering of the ambient air. On the outlet side, the air flow is optionally guided turbulent and laminar. In the laminar variant, air flows are paralleled by means of air baffles. This creates a laminar air flow from the FFU to the floor of the room.

Filter fan units are primarily found in ceiling systems of clean and ultra clean rooms, as found in semiconductor production, the microsystems industry, the pharmaceutical and food industries. A larger number of filter fan units (FFU) is typically installed in rows and columns in a clean room ceiling. Each FFU is responsible for a specific portion of the clean room. Each FFU can be individually controlled using a central computer. This principle makes it possible to specify individual setpoint values for temperature and air flow (fan speed) for each portion of a clean room covered by a FFU. A FFU which is located above a heat generating machine will deliver somewhat cooler air, for example. In this manner, a uniform temperature gradient and a uniform air flow are generated throughout the clean room. At the same time, energy demand is reduced. But the exact positions of the fans in the network are needed in order to trigger them by means of the controller in a fan plan or room layout plan, to easily determine their position in the event of a fault and to reduce the monitoring and maintenance effort in this manner.

Various approaches are known from prior art to perform such positioning and to represent the determined positions of the fans or FFUs in a room layout plan, particularly a spatial network map or to transfer these positions thereto. Conventionally, a spatial network map is created with a wiring diagram and the fans are drawn into the digital room layout plan and must be installed and connected in the sequence specified, which is a comparatively major effort because it must always be ensured during installation that a fan with a specified network address is installed at the correct position.

Alternatively, prior art includes the option to determine the position of each fan using GPS technology and to transfer the GPS position to a write register in the fan. For this purpose, however, the controller must be configured such that it can read out these network addresses and the position from the register to transfer the position to a room layout plan. Furthermore, a GPS signal is often not available in a clean room.

We have found that it is also conceivable to provide the address for reading out in the form of an address label or barcode in alphanumeric representation on the device. After installing a respective fan (or FFU, respectively), the associated label with the specified, predetermined position is adhered to the fans or FFU and then scanned. This entails the risk that incorrect assignments are made, particularly for a larger number of fans, and a major correction effort is needed to detect these incorrect assignments.

BRIEF SUMMARY

It is the underlying problem of the disclosure to overcome the disadvantages mentioned above and to provide an optimized and improved method as well as a respective device for determining the position of fans, particularly of fans arranged in a room.

This problem is solved by the combination of features according to claim 1.

According to the disclosure, a method for determining the position of a number of fans $V_{n,m}$ for generating an air flow in a preferably enclosed space is proposed. The fans $V_{n,m}$ have a speed sensor for determining the position and are preferably arranged in rows and columns. The position of at least one fan $V_{i,j}$ is known as the reference position. The method further comprises the following steps:

Driving the at least one fan $V_{i,j}$, the position of which is known, to initiate a rotation at least of fans $V_{n,m}$ arranged immediately adjacent in a row and column position (immediately means in this context that no other fan is arranged in the space between the affected fan and the fan the position of which is known);

detecting the speed of the fans $V_{n,m}$ driven by the air flow generated in this manner using a detector and controller and determining the potential neighborhood positions of these fans $V_{n,m}$ based on an iterative exclusion algorithm, wherein the steps a) and b) are repeated for the respectively determined fans $V_{n,m}$ until all positions of the fans $V_{n,m}$ have been determined.

The operational concept of the disclosure is described below.

The fans can, for example, be arranged in a suspended ceiling of a clean room. A fan with a known absolute spatial position is deliberately driven by its own drive, e.g. an EC motor, to generate an external drive in immediately adjacent fans which have the smallest distance to the fan with the known position. This external drive occurs due to a resulting pressure difference, particularly between the clean room and the space defined by the suspended ceiling. The rotation induced in this manner can be detected by means of the integrated speed detector (e.g. a speed sensor). The externally driven fan must be located immediately adjacent to the fan that is already known. For this purpose, the fans are arranged in a rectangular or square array, such that adjacent fans are arranged in a row, whereby these fans can be divided into rows and columns, which are preferably arranged at a right angle to each other. For the exact determination of the position in a square or rectangular arrangement of multiple fans, at least two deliberately driven fans having an exact, unknown position must be arranged immediately adjacent to, or at a small distance from, the fan. It is insignificant in this context if the position of the fan with an unknown position needed for determining positions was known before or if it was determined by the method described herein. As soon as an intersection point is created, that is, two fans with known positions drive a common externally driven fan in the immediate vicinity, the position of the latter can be determined relative to the fans with absolutely known positions.

It is preferred that the fans $V_{n,m}$ are set to idling by means of the controller prior to step a). This facilitates an external drive of the fans for performing automatic positioning, since otherwise the resistance of the fan against an external drive is too high.

In an advantageous embodiment, the fan $V_{i,j}$ with a known position in step a) is driven at a maximum degree of activation and the position of the fan $V_{i,j}$ is set to the known position. This will create a sufficiently high pressure difference for externally driving the adjacent fans.

Furthermore, an embodiment is favorable in which the measuring of the speed in step b) of the fans $V_{n,m}$ driven by the generated air flow and the transmission of the data to the controller is performed by means of the speed sensors. Since a speed of the fans $V_{n,m}$ is registered, these fans can be identified as externally driven fans $V_{n,m}$.

In another advantageous variant, the determining the positions of all fans $V_{n,m}$ having an unknown position in a row and/or column position immediately adjacent to the fan $V_{i,j}$ is implemented in step b) based on the position of the driving fan $V_{i,j}$. The advantage is that, starting from the known position of the driving fan $V_{i,j}$, any and all unknown positions of the other fans $V_{n,m}$ can be determined in accordance with their position relative to the driving fan $V_{i,j}$, which means that their positions can be determined using these methods.

It is further advantageous that the fan $V_{i,j}$ with a known position is switched to idling by means of the controller after step b). In this manner, the fan $V_{i,j}$ having a known position is enabled for potential external driving for subsequent steps of the method.

In a preferred embodiment of the method, driving of at least two of the fans $V_{n,m}$ detected in step b) is performed at a predetermined, preferably maximum, degree of activation. The drive of one of the fans $V_{n,m}$ detected in step b) in turn externally drives its adjacent fans $V_{n,m}$.

According to an embodiment of the disclosure, the unknown positions of fans $V_{n+1,m}$; $V_{n,m+1}$ located immediately adjacent to the fan $V_{n,m}$ driven in step b) are marked with the position of the driving fan $V_{n,m}$. Herein n+1 or m+1, respectively, indicate that the fan is at a position at a larger distance from the driving fan $V_{n,m}$ within a row or column. The marking or a bookmark function is used to indicate that the marked fan $V_{n+1,m}$; $V_{n,m+1}$ has already been driven externally. In addition, the marking or bookmark function specifies the fan $V_{n,m}$ which externally drove the fan $V_{n+1,m}$; $V_{n,m+1}$. As a result, a relative position of the fan $V_{n+1,m}$; $V_{n,m+1}$ to the fan $V_{n,m}$ can be determined.

According to the disclosure, the driven fan $V_{n,m}$ is switched to idling after marking the adjacent fans $V_{n+1,m}$; $V_{n,m+1}$ having an unknown position, and one of the other marked fans $V_{n+1,m}$; $V_{n,m+1}$ is driven at a maximum degree of activation. The steps of the method are performed successively for all fans $V_{n,m}$.

According to an advantageous embodiment of the present disclosure, the speed of the adjacent fans $V_{n+2,m}$; $V_{n,m+2}$ with an unknown position, which are driven by the fan $V_{n+1,m}$; $V_{n,m+1}$, is determined by means of speed sensors, and the data is transmitted to the controller. Since the speed of the fans $V_{n+2,m}$; $V_{n,m+2}$ is registered, these fans $V_{n+2,m}$; $V_{n,m+2}$ can once again be identified as externally driven fans.

It is further advantageously envisaged that the positions of the adjacent fans with an unknown position are marked in step b) with the position $V_{n+2,m}$; $V_{n,m+2}$ of the driving fan $V_{n+1,m}$; $V_{n,m+1}$. The marking is used to indicate once again that the marked fan $V_{n+2,m}$; $V_{n,m+2}$ has already been driven externally. In addition, the marking specifies the fan $V_{n+1,m}$; $V_{n,m+1}$ which externally drove the fan $V_{n+2,m}$; $V_{n,m+2}$. As a result, a relative position of the fan $V_{n+2,m}$; $V_{n,m+2}$ to the fan $V_{n+1,m}$; $V_{n,m+1}$ can be determined.

The method is preferably performed in such a manner that, if a fan $V_{n+1,m}$; $V_{n,m+1}$; $V_{n+2,m}$; $V_{n,m+2}$ is already marked, the position of the fan is set to a unique specific position. This results in an interface in which both markings are offset against each other. It is further advantageous if the position (n, m) of the fan ($V_{n+1,m}$; $V_{n,m+1}$) is determined by comparing the indices n and m of the existing marking to the newly created marking. The respective higher index represents the index for the determined position.

The respective higher value of the respective index is carried over. This intersection position yields the relative coordinates which can be multiplied by absolute values (distance between the individual fans).

Further advantageous is an embodiment in which one of the marked fans $V_{n+1,m}$; $V_{n,m+1}$ is driven until all fans $V_{n,m}$ are determined. As a result, the complete system of fans $V_{n,m}$ is position determined with respect to the arrangement of the fans $V_{n,m}$ to each other.

According to the disclosure, a method for determining the positions of a number of fans $V_{n,m}$ for generating an air flow in a preferably enclosed space according to the preceding claims, which fans have a speed sensor for positioning, wherein the fans $V_{n,m}$ are arranged in rows and columns, wherein at least the position of a fan $V_{i,j}$ is known, wherein a controller is provided which is configured to activate and determine the positions of, the fans $V_{n,m}$, wherein each of the fans $V_{n,m}$ can be indirectly driven by an adjacent fan $V_{n+1,m}$; $V_{n,m+1}$, the method comprising the following steps:

a. setting the fans $V_{n,m}$ to idling by means of the controller,
b. driving the fan $V_{i,j}$ with a known position at a maximum degree of activation and setting the position of the fan to the known position,
c. measuring the speed of the fans $V_{n,m}$ driven by the air flow generated and transmitting the data to the controller by means of the speed sensors,
d. determining those positions of all fans $V_{n,m}$ in a row and/or column position immediately adjacent to the fan $V_{i,j}$ based on the position of the driving fan $V_{i,j}$,
e. setting the fan $V_{i,j}$ with the known position to idling by means of the controller,
f. driving one of at least two of the detected fans $V_{n,m}$ at a predetermined, preferably maximum, degree of activation,
g. marking the unknown positions of fans $V_{n+1,m}$; $V_{n,m+1}$ located immediately adjacent to the fan $V_{n,m}$ driven in step f) with the position of the driving fan $V_{n,m}$,
h. switching the driven fan $V_{n,m}$ to idling and driving at least the second marked fan $V_{n,m}$ at a maximum degree of activation,
i. determining the speed of the adjacent fans $V_{n+1,m}$; $V_{n,m+1}$ with unknown positions driven by the second fan ($V_{n,m}$) by means of the speed sensors and transmitting the data to the controller,
j. marking the unknown positions of fans $V_{n+1,m}$; $V_{n,m+1}$ located immediately adjacent to the fan $V_{n,m}$ driven in step i) with the position of the driving fan $V_{n,m}$; $V_{n,m}$, k. if a fan Vn+1,m; Vn,m+1 has already been marked in step g) or step j), respectively, determining and setting the position of the fan Vn+1,m; Vn,m+1 to a unique, specific position, l. driving one of the fans marked in step g) or j), respectively, and repeating the steps f) to k) until all fans are determined.

According to an advantageous embodiment of the present disclosure, the position of the fan Vi,j is set to the value "0,0", and if the positions of two immediately adjacent fans Vn+1,m; Vn,m+1 are known for a fan Vn,m and the position of another immediately adjacent fan Vn+1,m; Vn,m+1 is unknown, and if a marking of the unknown position has the value "0,0", the marking not equal to "0,0" is subsequently incremented by 1. In this manner, the positions of all fans Vn,m can be determined which are arranged at the outer edge sections within the square arrangement of rows and columns In a preferred embodiment of the method, only the fans (Vn+1,m; Vn,m+1) having the highest speed are considered, if more than the immediately adjacent fans (Vn+1,m; Vn,m+1) were driven in steps f) and l). Since, due to the external drive, the fans Vn+1,m; Vn,m+1 which are at a greater distance from the driven fan Vi,j than the fans Vn,m have a lower speed, the fans Vn,m at the smallest distance from the driven fan Vi,j can be uniquely determined.

According to the disclosure, the speed sensor for determining the speed of a fan Vn,m is a Hall sensor. It would also be conceivable to perform a back EMF measurement and to infer the fan position based on the induced voltage, as described above.

In another advantageous embodiment, at least two fans Vn,m must be indirectly driven for exact positioning in steps f) to l).

BRIEF DESCRIPTION OF THE DRAWINGS

Other advantageous further developments of the disclosure are characterized in the dependent claims or are explained in detail below along with the description of the preferred embodiments of the disclosure with reference to the figures. In the drawings:

DETAILED DESCRIPTION

Figure 1:
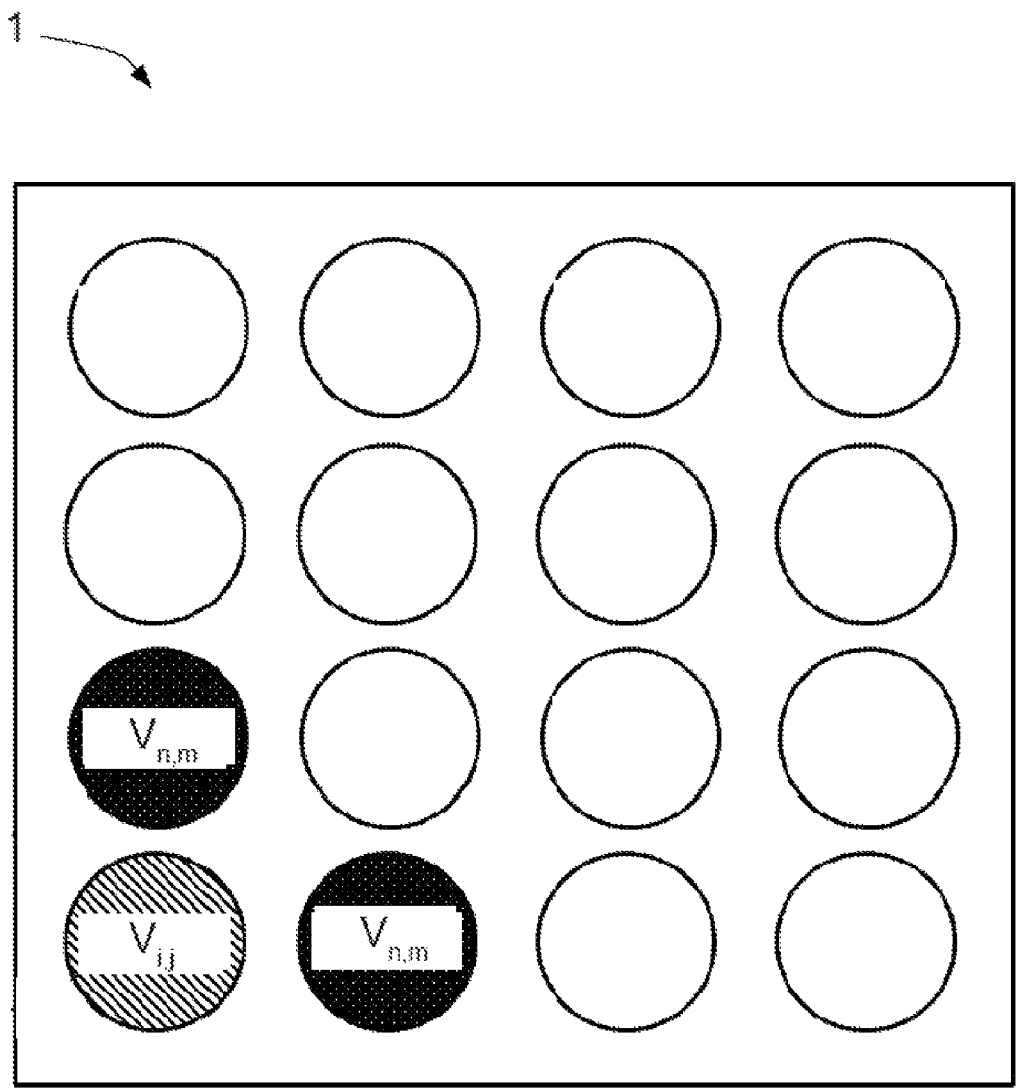
FIG. 1 to FIG. 6 are schematic representations of an exemplary positioning system having a driven fan with a known position and two externally driven fans.

FIG. 1 is a schematic representation of an exemplary positioning system having a driven fan Vi,j with a known position and two externally driven fans Vn,m. Idling of the fans Vn,m is activated by the controller for performing automatic position determination. In addition, the fans Vn,m are arranged in a rectangular or square array of rows and columns, in which the maximum distance between two fans is such that external driving can only just be effected. Position determination is started based on a fan Vi,j, which is located in one of the four corners of the system. The position of this fan Vi,j is known. The fan Vi,j is further driven at a maximum degree of activation, such that the fans Vn,m located at the smallest distance from the positionally known fan Vi,j are externally driven. The externally driven fans Vm,n rotate in the opposite direction with respect to the deliberately driven fan Vi,j. This can also be used to distinguish the fans from each other.

Figure 2:
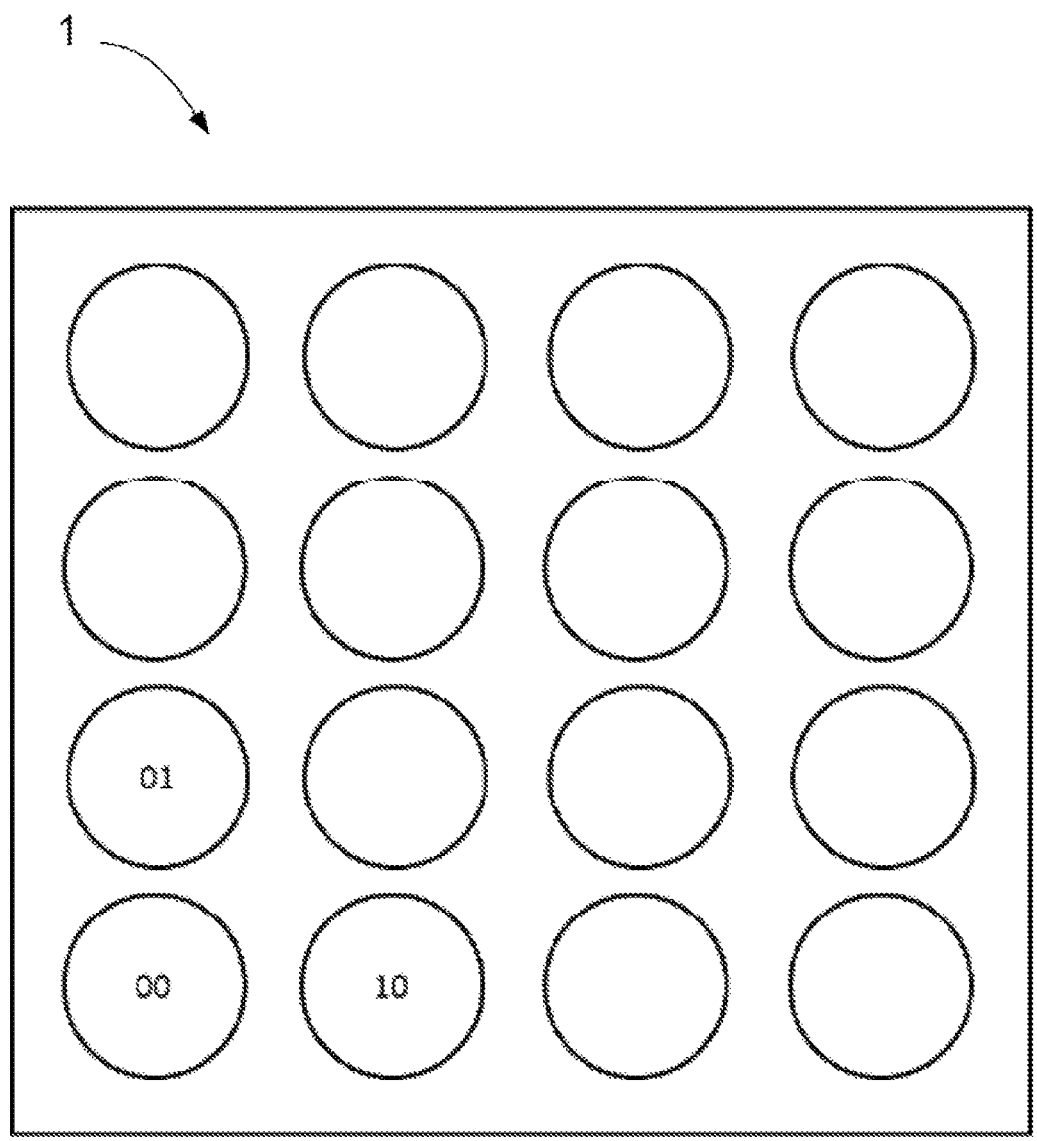

FIG. 2 shows a preliminarily determined position for the externally driven fans Vm,n. Since other fans Vm,n are in the environment at this point in time, which are also externally driven, unambiguous position determination is not yet possible. The positionally known fan Vi,j is located in a corner of the system. Since the system in the first step is underdetermined, including one fan Vi,j with a known position and two fans Vm,n with unknown positions, an assumption must be made regarding their propagation direction. One fan Vm,n is assigned the index "0,1" and the other fan Vm,n is assigned the index "10". The assignment is random and describes the propagation in n- or m-direction, similar to a Cartesian coordinate system. Since, as in error propagation, this assumption is carried along through the entire method a correction may be required at the end by switching the indices "n,m" to "n,m".

Figure 3:
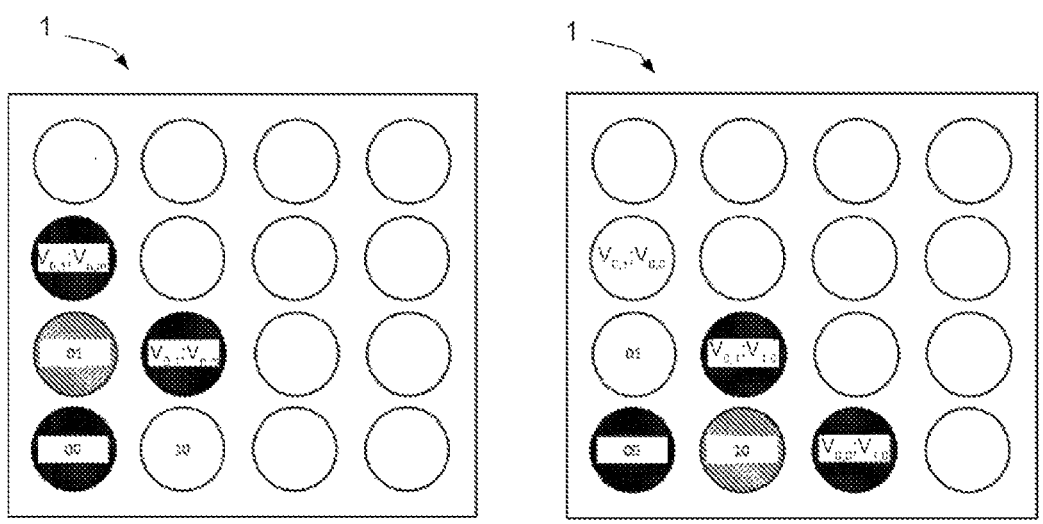

FIG. 3 shows that the newly determined fans Vm,n are alternately set to their own drive in the further steps of the method. This results in externally driving adjacent fans Vn+1,m; Vn,m+1. Each externally driven fan is once again assigned a marking which defines the fan Vn,m that caused the external drive.

Figure 4:
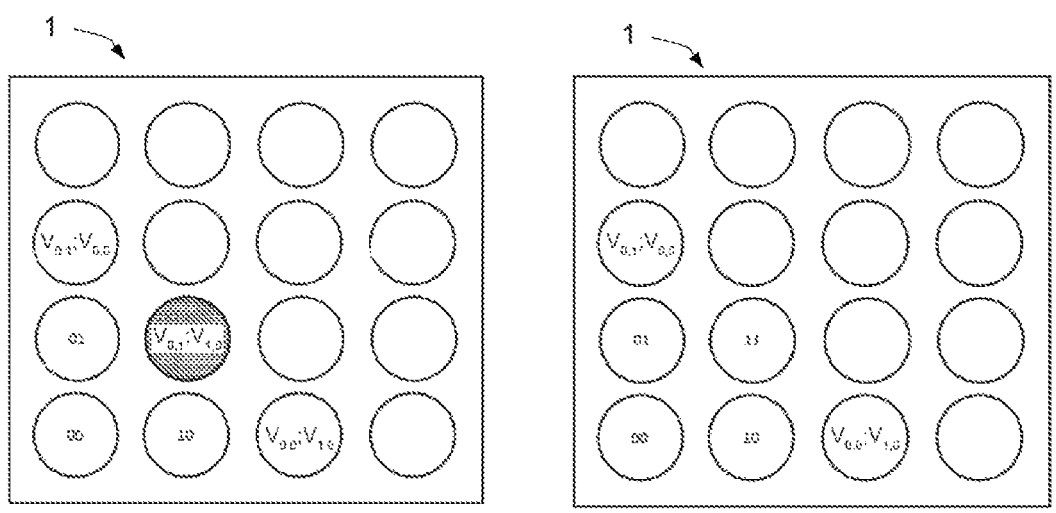

This results in the "interface" shown in FIG. 4. For position determination, both markings are placed on top of each other, and the respective higher value of the respective index n, m is carried over.

Figure 5:
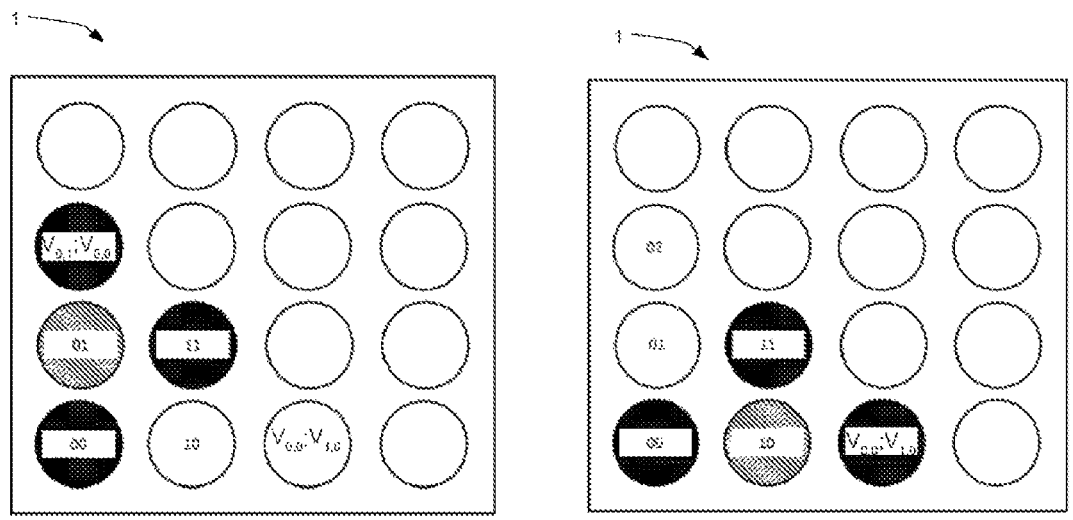

FIG. 5 shows renewed self-driving of the previously driven fans Vn,m. With this new determination, the fans on the edge can be determined uniquely based on the newly known fan Vn,m. A condition for an edge fan is defined that two positions are known and one is unknown. But the required condition for an edge fan is that the unknown position n,m is marked "0,0". If both conditions are met, a marking not equal to "0,0" is simply incremented. The new index in this case is "0,2" or "2,0", respectively.

Figure 6:
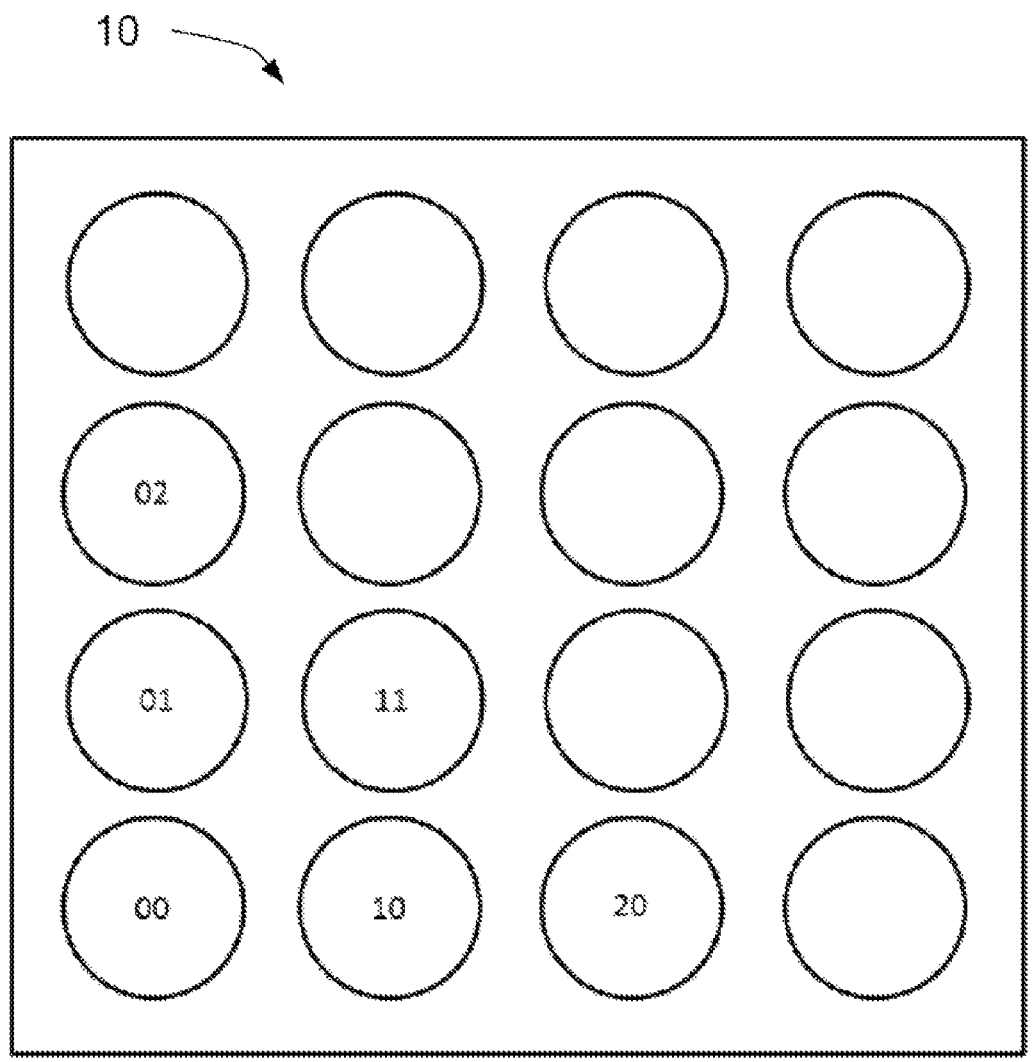

As shown in FIG. 6, the preceding steps of the method are repeated with the previously determined fans Vn,m to determine all positions.

The figures also unambiguously show what is meant by the term "immediately adjacent". It refers to a fan the row or column index of which is offset by one position with respect to the adjacent fan, thus the positions n−1, m, n, m−1, n−1, m−1, n+1, m+1 with respect to the position n,m.

The implementation of the disclosure is not limited to the preferred embodiments mentioned above. Instead, a plurality of variants is conceivable in which the solution described is used for completely different designs.

The invention claimed is:

1. A method for determining the positions of a number of fans ($V_{n,m}$) for generating an air flow in a space, the fans each having a speed sensor for determining their position, wherein the fans ($V_{n,m}$) are arranged in rows ($R_1, R_2, \ldots, R_n$) and columns ($S_1, S_2, \ldots, S_m$), wherein a position (I, j) of at least one fan ($V_{i,j}$) is known, the method comprising the following steps:

a) driving the at least one fan ($V_{i,j}$) in order to initiate a rotation of at least those fans ($V_{n,m}$) which are arranged in an adjacent row or column position;

b) detecting the speed of the fans ($V_{n,m}$) driven by the airflow generated in this manner using the speed sensor and a controller and determining the potential neighborhood positions of these fans using the controller, c) wherein the steps a) and b) are repeated for the fans ($V_{n,m}$) respectively determined after step b) until all positions (n,m) of the fans have been determined.

2. The method according to claim 1, wherein the fans ($V_{n,m}$) are set to idling by means of the controller prior to step a).

3. The method according to claim 1, wherein transmission of measurement data to the controller is performed by way of the speed sensors.

4. The method according to claim 1, wherein measuring the speed in step b) of the fans ($V_{n,m}$) driven by the generated air flow and the transmission of the data to the controller is performed by way of the speed sensors.

5. The method according to claim 1, wherein the determining of those positions (n, m) of all fans ($V_{n,m}$) having an unknown position in a row and/or column position immediately adjacent to the fan ($V_{i,j}$) is implemented in step b) based on the position of the driving fan ($V_{i,j}$).

6. The method according to claim 1, wherein the fan ($V_{i,j}$) with a known position is switched to idling by means of the controller after step b).

7. The method according to claim 1, wherein driving of at least two of the fans ($V_{n,m}$) detected in step b) is performed at a predetermined, preferably maximum degree of activation.

8. The method according to claim 1, wherein the unknown positions (n+1, m; n, m+1) of fans ($V_{n+1,m}$; $V_{n,m+1}$) located immediately adjacent to the fan ($V_{n,m}$) driven in step b) are marked with the position of the driving fan ($V_{n,m}$).

9. The method according to claim 8, wherein the driven fan ($V_{n,m}$) is switched to idling after marking the adjacent fans ($V_{n+1,m}$; $V_{n,m+1}$) having an unknown position, and one of the other marked fans ($V_{n+1,m}$; $V_{n,m+1}$) is driven at a maximum degree of activation.

10. The method according to claim 9, wherein the speed of the adjacent fans ($V_{n+2,m}$; $V_{n,m+2}$) having an unknown position, which are driven by the fan ($V_{n+1,m}$; $V_{n,m+1}$), is determined by means of speed sensors, and the data is transmitted to the controller.

11. The method according to claim 10, wherein the positions (n+2, m; n, m+2) of the adjacent fans having an unknown position are marked in step b) with the position ($V_{n+2,m}$; $V_{n,m+2}$) of the driving fan ($V_{n+1,m}$; $V_{n,m+1}$).

12. The method according to claim 1, wherein, if a fan ($V_{n+1,m}$; $V_{n,m+1}$; $V_{n+2,m}$; $V_{n,m+2}$) is already marked, the position (n+1, m; n, m+1; n+2, m; n, m+2) of the fan is set to a unique specific position (i, j).

13. The method according to claim 8, wherein one of the marked fans ($V_{n+1,m}$; $V_{n,m+1}$) is driven until all fans ($V_{n,m}$) are determined.

14. The method for determining the positions of a number of fans ($V_{n,m}$) for generating an air flow in a space according to claim 1, wherein a controller is provided which is configured to activate and determine the positions of the fans ($V_{n,m}$), wherein each of the fans ($V_{n,m}$) can be indirectly driven by a fan ($V_{n+1,m}$; $V_{n,m+1}$) in an adjacent row ($R_1$, $R_2$, ..., $R_n$) and column ($S_1$, $S_2$, ..., $S_m$), the method comprising the following steps:

a. setting the fans ($V_{n,m}$) to idling by means of the controller, b. driving the fan ($V_{i,j}$) with a known position at a maximum degree of activation and setting the position (i, j) of the fan ($V_{i,j}$) to the known position (i, j), c. measuring the speed of the fans ($V_{n,m}$) driven by the air flow generated and transmitting the data to the controller by means of the speed sensors, d. determining those positions (n, m) of all fans ($V_{n,m}$) in a row and/or column position immediately adjacent to the fan ($V_{i,j}$) based on the position of the driving fan ($V_{i,j}$), e. setting the fan ($V_{i,j}$) with the known position to idling by means of the controller, f. driving one of at least two of the determined fans ($V_{n,m}$) at a predetermined, preferably maximum, degree of activation, g. marking the positions (n+1, m; n, m+1) of fans ($V_{n+1,m}$; $V_{n,m+1}$) having unknown positions located immediately adjacent to the fan ($V_{n,m}$) driven in step f) with the position of the driving fan ($V_{n,m}$), h. switching the fan ($V_{n,m}$) driven in step f) to idling and driving a second fan ($V_{n,m}$) determined in step d) at a maximum degree of activation, i. determining the speed of the adjacent fans ($V_{n+1,m}$; $V_{n,m+1}$) having unknown positions, being driven by the second fan ($V_{n,m}$) by means of the speed sensors and transmitting the data to the controller, j. marking the positions (n+1, m; n, m+1) of fans ($V_{n+1,m}$; $V_{n,m+1}$) having unknown positions located immediately adjacent to the fan ($V_{n,m}$) driven in step i) with the position of the driving fan ($V_{n,m}$; $V_{n,m}$), k. if a fan ($V_{n+1,m}$; $V_{n,m+1}$) has already been marked in step g) or step j), respectively, determining and setting the position of the fan ($V_{n+1,m}$; $V_{n,m+1}$) to a unique, specific position (n, m), l. driving one of the fans marked in step g) or j), respectively, and repeating the steps f) to k) until all fans ($V_{n,m}$) are determined.

15. The method according to claim 14, wherein the position (n,m) of the fan ($V_{n+1,m}$; $V_{n,m+1}$) in step k) is determined by comparing the indices n and m of an already existing marking to the newly created marking, wherein the respective higher index represents the index for the determined position (n, m).

16. The method according to claim 15, wherein the position (i, j) of the fan ($V_{i,j}$) is set to the value "0,0", and if, during step k), the positions (n+1, m; n,m+1) of two immediately adjacent fans ($V_{n+1,m}$; $V_{n,m+1}$) are known for a fan ($V_{n,m}$) and the position (n+1, m; n,m+1) of a third immediately adjacent fan ($V_{n+1,m}$; $V_{n,m+1}$) is unknown, and if an already existing marking of the unknown position has the value "0,0", the newly created marking not equal to "0,0" is subsequently incremented by 1.

17. The method according to claim 15, wherein only the fans ($V_{n+1,m}$; $V_{n,m+1}$) having the highest speed are driven in step h), if more than the immediately adjacent fans ($V_{n+1,m}$; $V_{n,m+1}$) were driven by driving the determined and marked fans in steps f) and l).

18. The method according to claim 1, wherein the speed sensor for determining the speed of a fan ($V_{n,m}$) is a Hall sensor.

19. The method according to claim 15, wherein at least two fans ($V_{n,m}$) must be indirectly driven for exact positioning in steps f) to l).

* * * * *